(12) United States Patent
Holland

(10) Patent No.: US 9,026,316 B2
(45) Date of Patent: May 5, 2015

(54) VARIABLE RATE CHEMICAL MANAGEMENT FOR AGRICULTURAL LANDSCAPES WITH NUTRITION BOOST

(71) Applicant: Kyle H. Holland, Lincoln, NE (US)

(72) Inventor: Kyle H. Holland, Lincoln, NE (US)

( * ) Notice: Subject to any disclaimer, the term of this patent is extended or adjusted under 35 U.S.C. 154(b) by 283 days.

(21) Appl. No.: 13/633,249

(22) Filed: Oct. 2, 2012

(65) Prior Publication Data

US 2014/0091199 A1    Apr. 3, 2014

(51) Int. Cl.
G01C 22/00    (2006.01)
A01C 21/00    (2006.01)

(52) U.S. Cl.
CPC .................................... A01C 21/007 (2013.01)

(58) Field of Classification Search
USPC .......... 382/100, 109, 110; 73/152.01–152.15;
348/85–95; 356/241.1–241.6; 701/28,
701/29, 50; 702/2, 5; 250/206.1; 111/118,
111/127–129
See application file for complete search history.

(56) References Cited

U.S. PATENT DOCUMENTS

| | | |
|---|---|---|
| 3,443,072 A | 5/1969 | Gibbs |
| 3,910,701 A | 10/1975 | Hendersen et al. |
| 4,055,768 A | 10/1977 | Bromberg |
| 4,369,886 A | 1/1983 | Lane et al. |
| 4,518,253 A | 5/1985 | Takahashi |
| 4,628,454 A | 12/1986 | Ito |
| 4,926,170 A | 5/1990 | Beggs et al. |
| 4,986,665 A | 1/1991 | Yamanishi et al. |
| 5,025,150 A | 6/1991 | Oldham et al. |
| 5,144,767 A | 9/1992 | McCloy et al. |
| 5,296,702 A | 3/1994 | Beck et al. |
| 5,389,781 A | 2/1995 | Beck |
| RE35,100 E * | 11/1995 | Monson et al. ............... 111/130 |
| 5,585,626 A | 12/1996 | Beck et al. |
| 5,763,873 A | 6/1998 | Beck et al. |
| 5,789,741 A | 8/1998 | Kinter |
| 5,809,440 A | 9/1998 | Beck et al. |
| 5,833,144 A | 11/1998 | Kinter |
| 5,837,997 A | 11/1998 | Beck |
| 6,160,902 A | 12/2000 | Dickson et al. |
| 6,336,066 B1 * | 1/2002 | Pellenc et al. .................. 701/50 |
| 6,393,927 B1 * | 5/2002 | Biggs et al. ..................... 73/866 |
| 6,596,996 B1 | 7/2003 | Stone et al. |
| 7,058,197 B1 | 6/2006 | McGuire et al. |
| 7,412,330 B2 * | 8/2008 | Spicer et al. ..................... 702/2 |
| 7,723,660 B2 | 5/2010 | Holland |
| 8,135,178 B2 | 3/2012 | Hendrickson et al. |
| 8,208,680 B2 * | 6/2012 | Scharf et al. .................. 382/100 |
| 8,260,507 B2 * | 9/2012 | Schumann et al. ............. 701/50 |
| 8,391,565 B2 * | 3/2013 | Purcell et al. ................. 382/110 |

(Continued)

OTHER PUBLICATIONS

Aronson, M.H., "Low-Level Measurements-8 Lock-in and Carrier Amplifiers", 1977, Measurements and Data Corporation, pp. C1-C15.

(Continued)

*Primary Examiner* — Robert Pezzuto
(74) *Attorney, Agent, or Firm* — McKee, Voorhees & Sease, P.L.C.

(57) ABSTRACT

An apparatus configured for dispensing nutrients is provided. The apparatus includes a dispensing system configured for dispensing the nutrients, a variable rate controller operatively connected to the dispensing system and configured to control dispensement of the nutrients from the dispensing system. The variable rate controller is programmed to determine a primary nutrient application rate and an additional nutrient boost rate.

22 Claims, 8 Drawing Sheets

(56) References Cited

U.S. PATENT DOCUMENTS

| | | | |
|---|---|---|---|
| 8,520,891 B2* | 8/2013 | Scharf et al. | 382/100 |
| 2004/0119020 A1 | 6/2004 | Bodkin | |
| 2010/0249998 A1 | 9/2010 | Holland | |
| 2012/0016517 A1 | 1/2012 | Holland | |

OTHER PUBLICATIONS

Burr-Brown, Applications Handbook, 1994, OPT201 Photodiode Amplifier Rejects Ambient Light, AB-061, p. 379.

Gage, S. et al., 1977 Optoelectronics Applications Manual, McGraw-Hill Book Company.

Haggar, R.J. et al., "A Prototype Hand-held Patch Sprayer for Killing Weeds, Activated by Spectral Difference in Crop/Weed Canopies", Agricultural Research Council, Nov. 15, 1982, pp. 349-358.

Haggar, R.J. et al., "Measuring Spectral Differences in Vegetation Canopies by a Reflectance Ratio Meter", Weed Research, vol. 24, pp. 59-65.

Hooper, M.W. et al., "A Photoelectric Sensor for Distinguishing Between Plant Material and Soil", J. Argic. Engng. Res. 1976, pp. 145-155.

Hyder, Dave, "Infrared Sensing and Data Transmission Fundamentals", Industrial Control Applications, Mar. 1991. Motorola DL 412/D, AN1016, pp. 367-372.

Knipling, E. B., "Physical and Physiological Basis for the Visible and Near-infrared Radiation from Vegetation", 1970, American Elsevier Publishing Company, Inc., pp. 155-159.

McCabe D., "An Eye on Nitrogen", Precision Ag, Mar. 2004, pp. 21-23.

McCabe, Don, "Seeing the Light of Nitrogen", Mid-Feb. 1996. Nebraska Farmer, pp. 14, 15 and 20.

Motorola, "Linear and Interface Integrated Circuits", 1988, MC3373 Datasheet, pp. 9-43 to 9-46.

Palmer, J. et al., "Automatic Control of Sugar Beet Singling and Thinning by Means of an On-line Digital Computer", J. Agric. Eng. Res., vol. 16(2), pp. 107-125.

Ritchie, J.C. et al., "Airborne Laser Measurements of Rangeland Canopy Cover and Distribution", 1992, J. Range Mange 45:189-193.

Rsichenberger, Larry, "Tools with Eyes", Mid-Mar. 1989, Farm Journal, pp. 16-18.

Searcy, S.W. et al., "Measurement of Agricultural Field Location Using Microwave Frequency Triangulation", 1990, Computers and Electronics in Agriculture, vol. 4, pp. 209-233.

Stafford, J. V. et al., "A Portable Infrared Moisture Meter for Agricultural and Food Materials: Part 1, Instrument Development", 1989, J. Agric. Eng. Res., vol. 43, pp. 45-56.

Thompson, J.F. et al., "Potential for Automatic Weed Detection and Selective Herbicide Application" Crop Protection, vol. 10, Aug. 1991, pp. 254-259.

Girma, Kefyalew et al., "Nitrogen Accumulation in Shoots as a Function of Growth Stage of Corn and Winter Wheat", Journal of Plant Nutrition, Dec. 1, 2010, 34:2, 165-182.

Hodgen, P. J. et al., "Relationship Between Response Indices Measured In-Season and at Harvest in Winter Wheat", Journal of Plant Nutrition, 2005, 28: 221-235.

Holland, K. H. et al., "Derivation of a Variable Rate Nitrogen Application Model for In-Season Fertilization of Corn", Agronomy Journal, 2010, vol. 102, Issue 5, pp. 1415-1424.

Raun, William R. et al., "Independence of yield potential and crop nitrogen response" Precision Agri., Oct. 2, 2010, DOI 10.1007/s11119-010-9196-z; Springer Science+Business Media, LLC, 2010.

Raun, William R. et al., "Chapter 10—Temporally and Spatially Dependent Nitrogen Management for Diverse Environments" c10.indd, Jan. 22, 2009, pp. 203-214.

Shanahan, J.F. et al., "Responsive in-season nitrogen management for cereals", Computers and Electronics in Agriculture 61 (2008) pp. 51-62.

* cited by examiner

US 9,026,316 B2

VARIABLE RATE CHEMICAL MANAGEMENT FOR AGRICULTURAL LANDSCAPES WITH NUTRITION BOOST

FIELD OF THE INVENTION

The present invention relates to variable rate chemical management for agricultural landscapes. More particularly, but not exclusively, the present invention relates to real-time sensor based application of agrochemicals.

BACKGROUND OF THE ART

Various methodologies are available to crop producers which allow them to apply agrochemicals. Variable rate application (VRA) of agrochemicals is an important in various types of crop production. The use of VRA is advantageous because it reduces the amount of unnecessary application of agrochemicals, reduces the likelihood of under application of agrochemicals and thus there are economic as well as environmental advantages to using variable rate application of agrochemicals instead of a fixed rate.

What is needed is an enhancement to variable rate application to allow an additional amount of nutrient or micronutrient to be applied to the crop and/or soil to feed both crop and soil microflora.

SUMMARY OF THE INVENTION

Therefore, it is a primary object, feature, or advantage of the present invention to improve over the state of the art.

It is a further object, feature, or advantage of the present invention to provide for a method and apparatus for variable rate application that allows an additional amount of nutrient or micronutrient to be applied to the crop and/or soil to feed both crop and soil microflora.

It is another object, feature, or advantage of the present invention to provide a method and apparatus for variable rate application that provides for determining an additional nutrient boost rate that is to be applied.

It is a further object, feature, or advantage of the present invention to provide for methods for calculating the additional nutrient boost rate.

A still further object, feature, or advantage of the present invention is to receive input from a user, or directly from a seed container or otherwise which may be used in determining the additional nutrient boost rate.

One or more of these and/or other objects, features, or advantages will become apparent from the specification and claims that follow. No single embodiment of the present invention need exhibit each or any of the objects, features, or advantages. The present invention is not to be limited by or to these objects, features, or advantages.

According to one aspect, an apparatus is configured for dispensing nutrients. The apparatus includes a dispensing system configured for dispensing the nutrients and a variable rate controller operatively connected to the dispensing system and configured to control dispensement of the nutrients from the dispensing system. The variable rate controller is programmed to determine a primary nutrient application rate and an additional nutrient boost rate. The dispensing system may include both a primary nutrient flow system for dispensing the nutrients according to the primary nutrient application rate and a secondary nutrient flow system for dispensing the nutrients according to the additional nutrient boost rate. The variable rate controller may be programmed to determine the additional nutrient boost rate based on planting population. The variable rate controller may determine a sufficiency index (or vegetation/soil index, or reflectance, from sensor) for the crop and then use the sufficiency index (or vegetation/soil index, or reflectance, from sensor) in determining the primary nutrient application and the additional nutrient boost rate. The additional nutrient boost rate may be determined using a nutrient boost function which may be a simple step function or a more complex function. The additional nutrient boost rate may be more than 10 percent of an optimum value for the primary nutrient application rate and generally preferably in a range of 10 percent of the optimum value for the primary nutrient application rate to 20 percent of the optimum value for the primary nutrient application rate. The additional boost rate may be received by scanning information associated with the container of seed, wirelessly reading information associated with the container of seed, or receiving user input based on data provided by the container of seed. The additional nutrient boost application rate may be determined at least partially by planting population. The additional nutrient boost application rage may be determined at least partially based on a prescription map.

According to another aspect, a method for application of nutrients for a crop within a field is provided. The method includes determining a primary nutrient application rate using a controller, determining an additional nutrient boost rate using the controller, and applying a nutrient to the crop or the field at the primary nutrient application rate and at the additional nutrient boost rate using a dispensing system. The nutrient may then be applied at the primary nutrient application rate using a primary nutrient flow system. The nutrient may also be applied at the additional nutrient boost rate using a secondary nutrient flow system. A sufficiency index for the crop may be determined and used in determining the primary nutrient application rate and or the additional nutrient boost rate. Alternatively the additional nutrient boost rate may be received as input such as when the boost rate is associated with a container of seed.

DETAILED DESCRIPTION

Variable rate application (VRA) of agrochemicals is an important in various types of crop production. The use of VRA is advantageous because it reduces the amount of unnecessary application of agrochemicals, reduces the likelihood of under application of agrochemicals and thus there are economic as well as environmental advantages to using variable rate application of agrochemicals instead of a fixed rate. In order to enhance the effectiveness of the applicator system, it is sometimes necessary to apply an additional amount of nutrient or micronutrient to the crop and/or soil to feed both crop and soil microflora. The present invention describes a method of utilizing a nutrient boost method with a real-time or map-based applicator system. The various methods, apparatus, and systems of the present invention allow for effective application of agrochemicals in a manner that is simple for crop producers to implement.

FIG. 1A to FIG. 1H illustrate different embodiments of an apparatus of the present invention. It is to be understood that no single embodiment need include all of the components shown in any of these figures. It is to be further understood that the present invention allows for components from different figures to be combined in a particular embodiment.

Figure 1A:
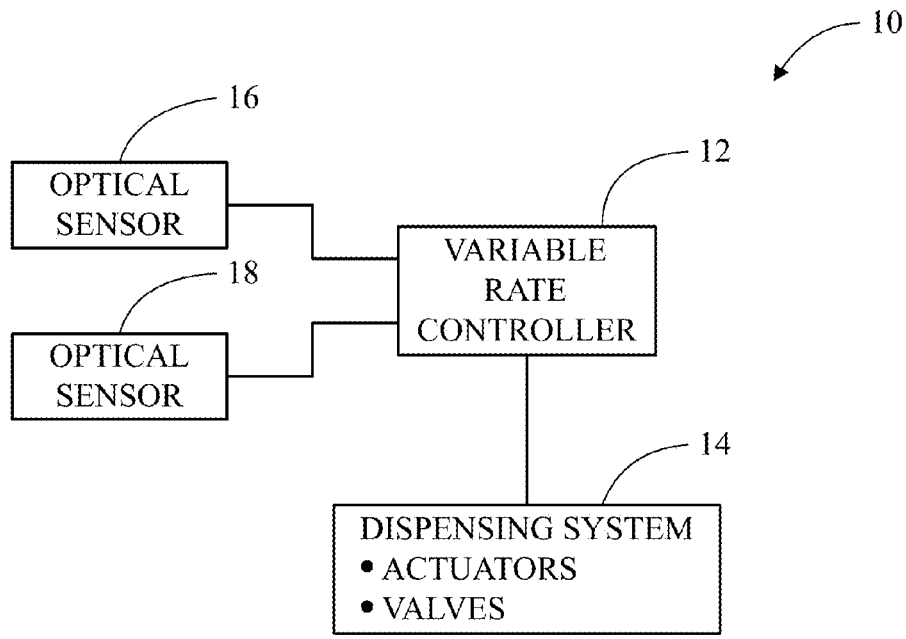
FIGS. 1A-1H illustrate various embodiments of apparatus and systems of the present invention.

In FIG. 1A a system 10 includes a variable rate controller 12. A dispensing system 14 is operatively connected to the variable rate controller 12 and the variable rate controller 12 is configured to control the dispensing system 14. The dispensing system 14 is configured to dispense nutrients or agrochemicals and may use actuators, valves, or other components to do so. The dispensing system 14 may have one or more nutrient flow systems. Also in system 10, an optical sensor 16 and an optical sensor 18 are operatively connected to the variable rate controller 12. Although two optical sensors are shown, the present invention contemplates more or fewer sensors being used. The optical sensor 16 may be used for sensing plant growth parameters and the optical sensor 18 may be used for sensing soil color parameters. Of course, different configurations of sensors may be used.

The variable rate controller 12 is programmed or otherwise configured to control dispensement of nutrients from the dispensing system. For example, the variable rate controller 12 may be programmed to determine a primary nutrient application rate and an additional nutrient boost rate.

Figure 1B:
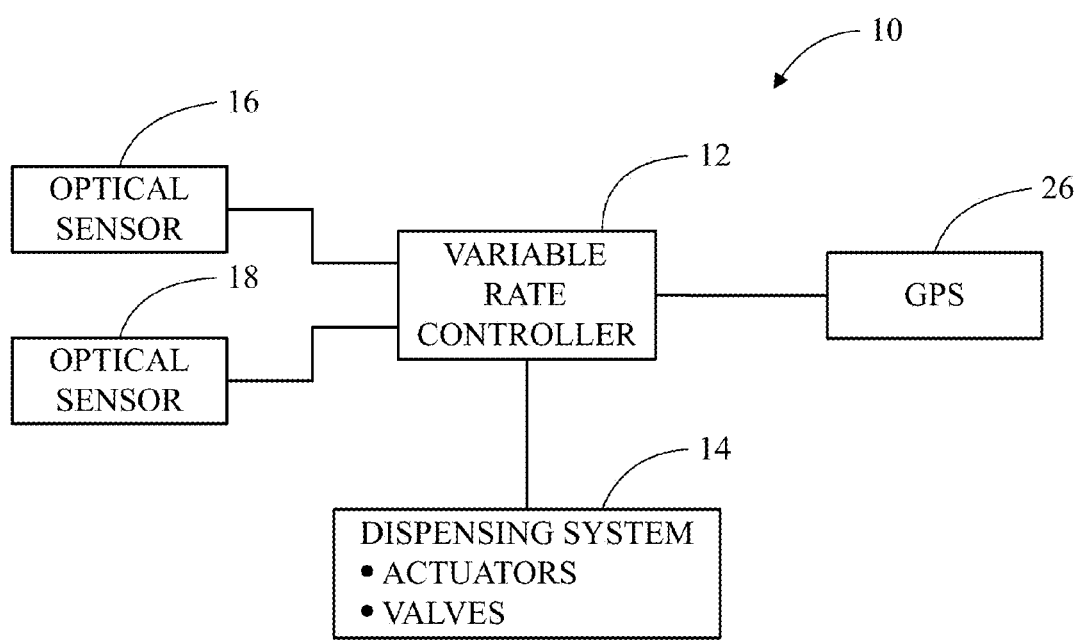

In FIG. 1B, a GPS receiver 26 is operatively connected to the variable rate controller to provide geoposition information. The variable rate controller may use information from the GPS 26 in an algorithm to assist in determining application of agrochemicals. For example, there may less application of agrochemicals at locations within a field having a low altitude as various models for determining application rate may take into account movement of agrochemicals due to water movement.

Figure 1C:
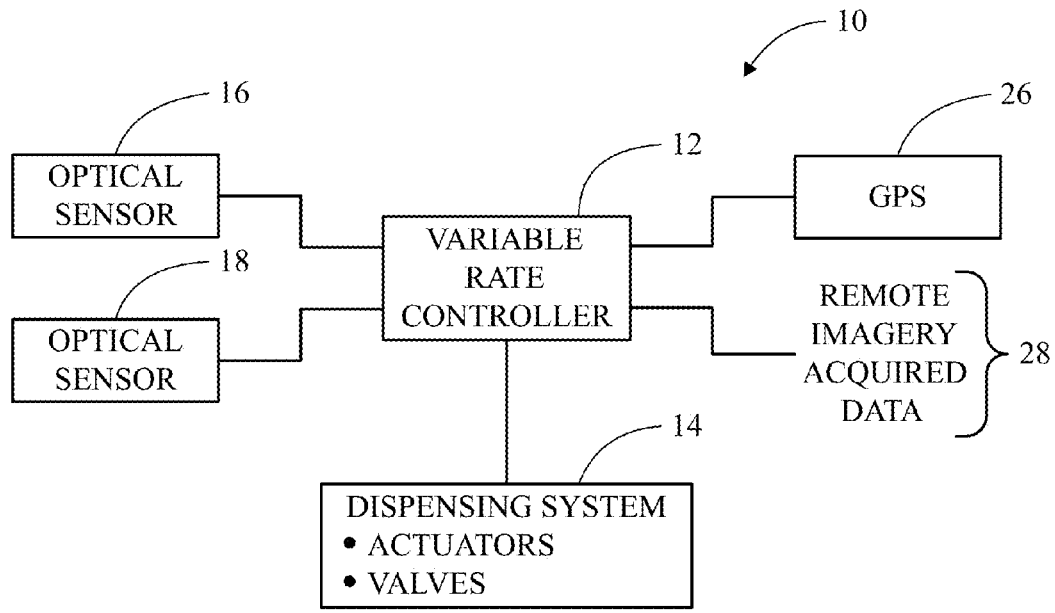

In FIG. 1C, remote imagery acquired data 28 is provided to the variable rate controller 12. The present invention contemplates that instead of or in addition to using optical sensors or other crop sensors for sensing vegetative state of a crop, this information may be acquired from remote sensing data.

Figure 1D:
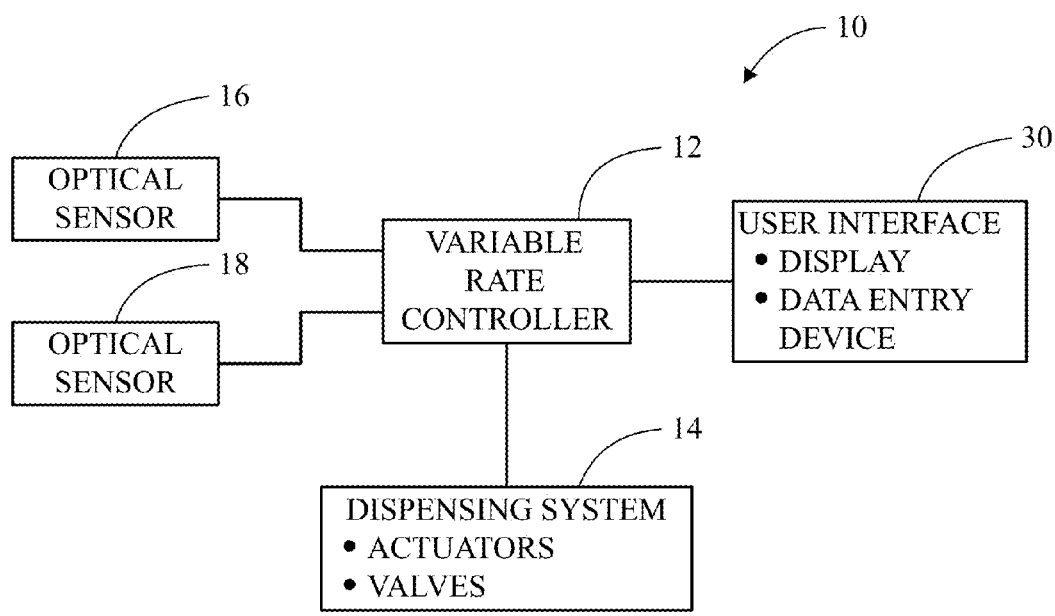

In FIG. 1D, a user interface 30 is operatively connected to the variable rate controller 12. The user interface 30 may include a display and a data entry device. The user interface 30 may be used by a crop producer or other user to specify a particular algorithm to use or to input plug values.

Figure 1E:
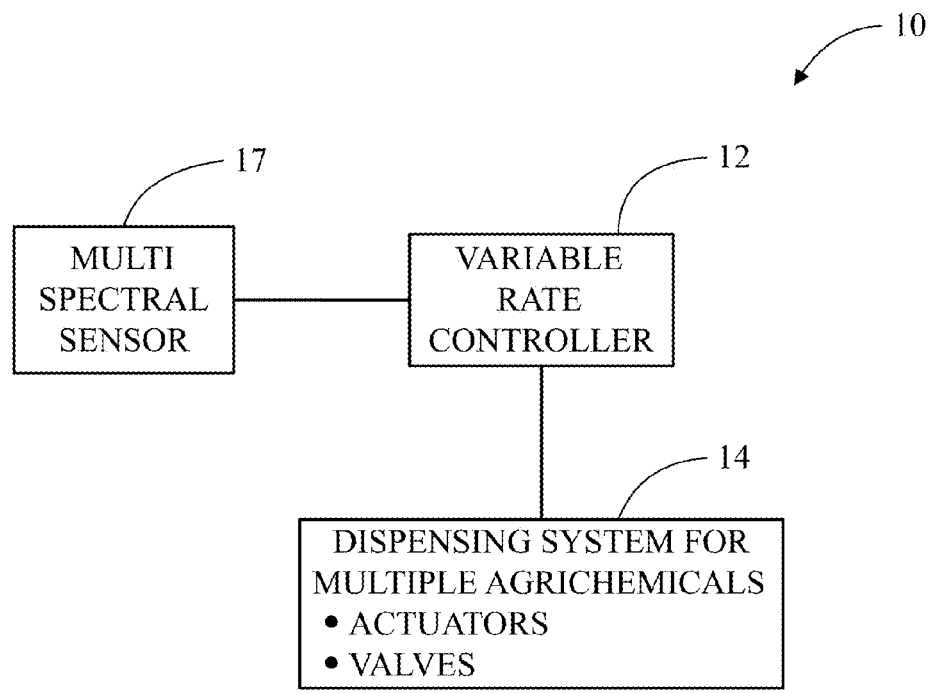

In FIG. 1E, a multispectral sensor 17 is operatively connected to the variable rate controller 12. In this embodiment, the dispensing system 14 may also be configured to dispense multiple types of agrochemicals.

Figure 1F:
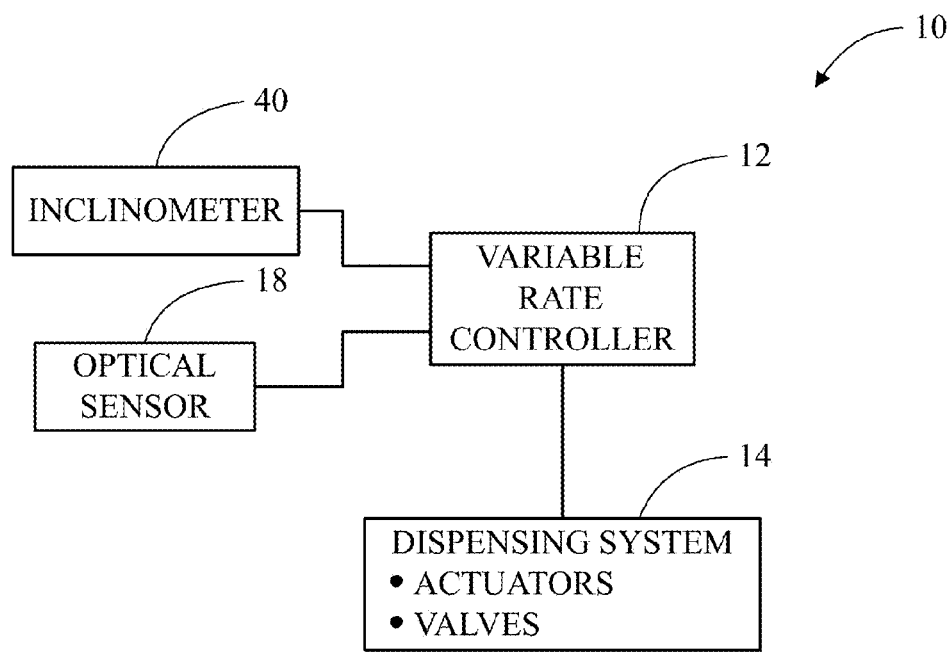

In FIG. 1F, an inclinometer 40 is operatively connected to the variable rate controller 12. In this embodiment the variable rate controller 12 uses an algorithm which is configured to take into account incline data when calculating application rates. In such an embodiment GPS altitude data need not be used. In some embodiments, the GPS and inclinometer may be used in tandem to better describe the topology of the field when applying agrochemicals or defining soil zones.

Figure 1G:
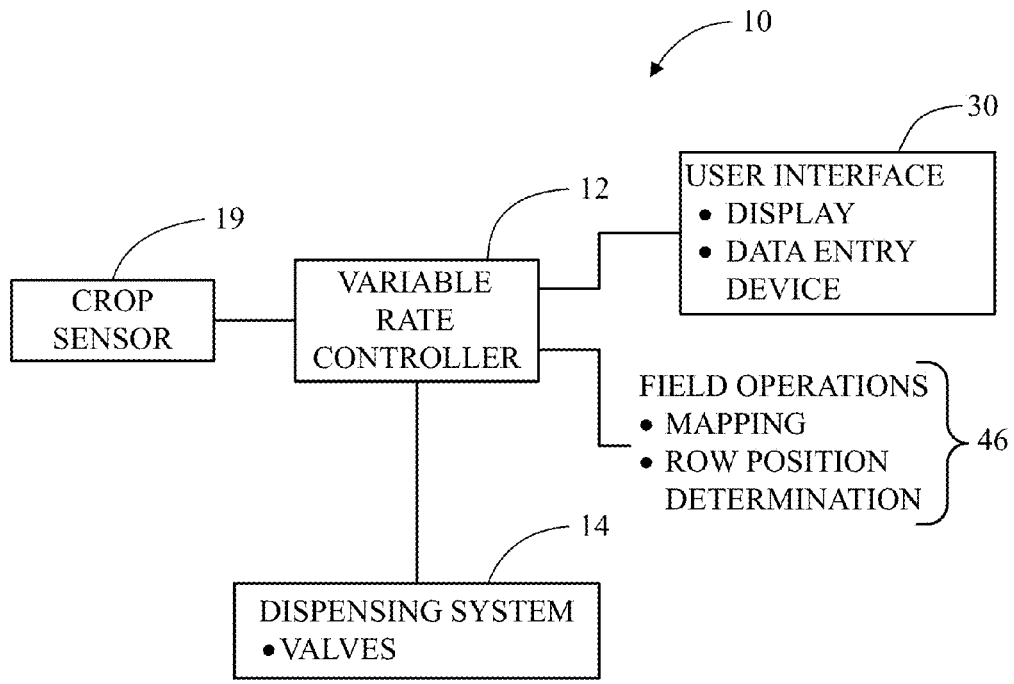

In FIG. 1G, a crop sensor is operatively connected to the variable rate controller 12. The crop sensor may be an optical sensor or other type of sensor. Also shown in FIG. 1G, the variable rate controller 12 may determine additional field operations in addition to dispensing rate. These may include mapping of the application of agrochemicals, row position determination, or other types of field operations.

Figure 1H:
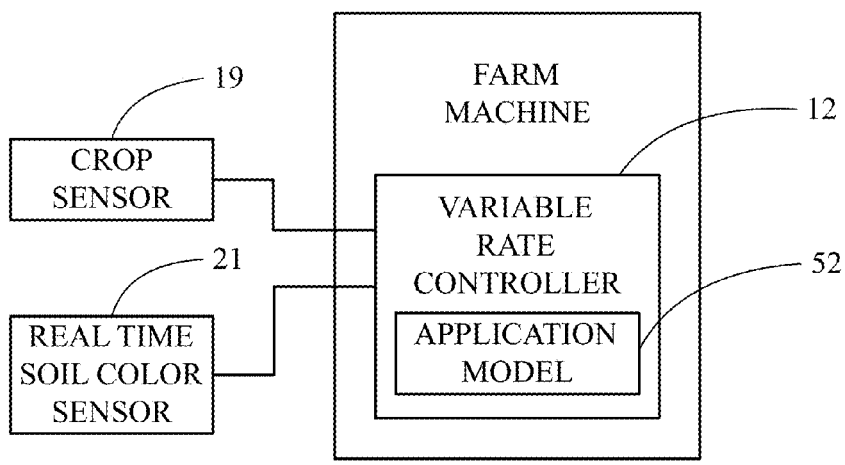

In FIG. 1H, the variable rate controller 12 is shown as part of a farm machine 50. An application model 52 is stored on a machine readable storage medium associated with the variable rate controller 12. A crop sensor 19 and a real-time soil color sensor 21 are operatively connected to the variable rate controller 12.

From these examples, it should be apparent that the present invention provides for variable application of agrochemicals to be performed in various ways using different types of sensors and different types of algorithms or models.

A primary agrochemical requiring intensive management for numerous crops is N fertilizer. For purposes of illustration, we will describe our method utilizing N fertilizer as the managed agrochemical; however, it will be apparent to those skilled in the art that the principles described for fertilizer application can be applied to other agrochemicals, nutrients, or materials.

Regarding the background science behind crop N status monitoring, it has been shown that the positive relationship between leaf greenness and crop nitrogen (N) status will allow the determination crop N requirements based on reflectance data collected from the crop canopy (Walberg et al., 1982; Girardin et al., 1985; Hinzman et al., 1986; Dwyer et al., 1991) and leaves (McMurtrey et al., 1994). Plants with increased levels of N typically have more chlorophyll (Inada, 1965; Rodolfo and Peregrina, 1962; Al-Abbas et al., 1974; Wolfe et al., 1988) and greater rates of photosynthesis (Sinclair and Horie, 1989). Hence, plants that appear a darker green are perceived to be healthier than N deficient plants. Chlorophyll in leaves absorbs strongly in the blue and red regions of the spectrum (460 nm and 670 nm) and reflects/transmits light in the green region (550 nm). Blackmer et al. (1994a,b,c) used a spectroradiometer to characterize the differences in light reflected from corn canopies receiving different N treatments. They found a strong relationship between green light (550 nm) and fertilizer N rate. In addition, green light reflectance from corn during the late milk stage (R4 to R5) was highly correlated with grain yield ($r^2$=0.98, ten N rates for one hybrid). As a result, it is the relationship between leaf greenness (reflected green light) and chlorophyll content (absorbance) which makes it possible to remotely sense or measure leaf greenness and obtain an indication of chlorophyll concentration and plant N status.

Adoption of automated N management practices will require methodologies that impact their current farming practices minimally. Recently there has been a trend in the United States by growers to apply nitrogen via split application, that is, some of the N is applied at planting time and the remainder is applied during the growing season when the crop is most responsive to nutrient. In other situations, N is applied in multiple doses during the growing season such as in European wheat and barley crops. Here, N in these cropping systems is applied at regular intervals to achieve certain biomass goals. Both split and dosage application farming practices can benefit from the agrochemical management methodology presented herein. Cotton is another crop that will benefit from this method. Both growth regulators and defoliants are applied in-season on cotton crops. With application of growth regulators, the goal is to achieve a uniform biomass throughout a field and use of a real-time sensing system controlled with the application methodology presented here will greatly benefit cotton growers. In all cases where sensor based technologies are utilized in making real-time agrochemical application decisions, a strong mathematical relation between the crop's sensed biophysical characteristic and the sensor's measurement is required. Often times a function that describes the plant's growth response (empirical or generalized) as it relates to sensor measurements is used and other times it may be a simple table of measurements and desired application rates. When using a generalized plant growth response function, the function can be manipulated so that the terms of the function are parameterized in terms of optimum nitrogen use and sensor values. For example, assume the shape of the curve in FIG. 2 can be described using a $2^{nd}$ order polynomial and can be stated mathematically as $$SI = \alpha_2 \cdot N^2 + \alpha_1 \cdot N + \alpha_0$$

where SI is the sufficiency index, $VI_{field}/VI_{Ref}$,
$\alpha_0, \alpha_1, \alpha_2$ are polynomial coefficients, and
N is the applied nitrogen rate in lbs/ac or kg/ha.

The relation above can be simplified and solved for the nitrogen application amount in terms of SI and optimum nitrogen. Doing so results in the following general nitrogen application equation for plant shown below.

$$N_{APP} = N_{OPT} \cdot \sqrt{\frac{(1-SI)}{\Delta SI}}$$

where SI is the sufficiency index, $VI_{field}/VI_{Ref}$,
$N_{OPT}$ is optimal or EONR nitrogen rate to apply to the crop,
$\Delta SI$ is the SI difference between healthy and fertilizer deficient crop and
$N_{APP}$ is the nitrogen amount to be applied to the crop in lbs/ac or kg/ha.

In practice, farming systems frequently involve split or even multiple applications of N fertilizer. Those N applications made before the time of crop sensing should be subtracted from $N_{OPT}$, as well as N credits from a previous cropping season. It follows then that $N'_{OPT}$ is calculated from insertion into the equation above using the prescribed N rate and other sources of N as follows:

$$N'_{OPT} = N_{OPT} - N_{PreFert} - N_{CRD} + N_{COMP} \quad (12)$$

where $N_{OPT}$ is the EONR or the maximum N rate prescribed by producers,
$N_{PreFert}$ is the sum of fertilizer N applied prior to crop sensing and/or in-season N application,
$N_{CRD}$ is the N credit for the previous season's crop, nitrate in water, or manure application and
$N_{COMP}$ is the N in excess of $N_{OPT}$ required by the crop under soil limiting conditions at a given growth stage.

For a more detailed discussion regarding derivation of the above equation please see Holland and Schepers (2010).

Albeit, the above equation is effective in correcting nutrient deficiencies in crops, however, the performance of equations like this and others can benefit from enhancing application rates for crops growing in the low N conditions. It should also be stated that the N (nutrient) parameters in the above equation are typically established prior to application by the operator and not in real-time. These crops would have SI's near $1-\Delta SI$. Crops growing under nutrient deficient conditions such as this require additional N not only for the crop but also for soil microorganisms. When soil nutrients are pumped down by the crop, a competition for available nutrients arises between the crop and soil microbes. A method that can improve crop yield performance helps bring the soil and crop into balance by boosting the nutrients applied to a crop with SI values approaching the $1-\Delta SI$ boundary. This nutrient boosting effectively supplies needed nutrient to both soil microbes and crop; subsequently improving crop yield. Sometimes the additional nutrient applied can consist only of nitrogen fertilizer. In other situations, a mix of micronutrients (such as, but not limited to Zn, S, Mn, and other nutrients as well as chelation agents, humic acid, herbicides, fungicides or other agrochemical materials) may also need to be applied to correct soil nutrient deficiencies or conditions. In other situations, both added fertilizer and micronutrients will be required by the crop. It should be noted that these mixtures can optimally be formulated for specific agricultural regions with specific soil needs and problems. Application can be to the soil or to the plants leaves. It should also be noted that some embodiments may use nutrient application models that use what is called a response index (RI). An RI is nothing more than the inverse of the SI (RI=1/SI) and is merely a modeling preference used by some developers of nutrient application models. As such, the RI is a function of the SI and therefore to calculate an RI, a reciprocal SI is calculated by proxy. Thus, as used herein, whenever a Sufficiency Index (SI) is referenced, it is to be understood that Response Index (RI) could be used instead as there is known mathematical relationship between an SI and an RI. Going further, some nutrient application models will only use a basic vegetation index or reflectance for determining the nutrient application rate.

Figure 2:
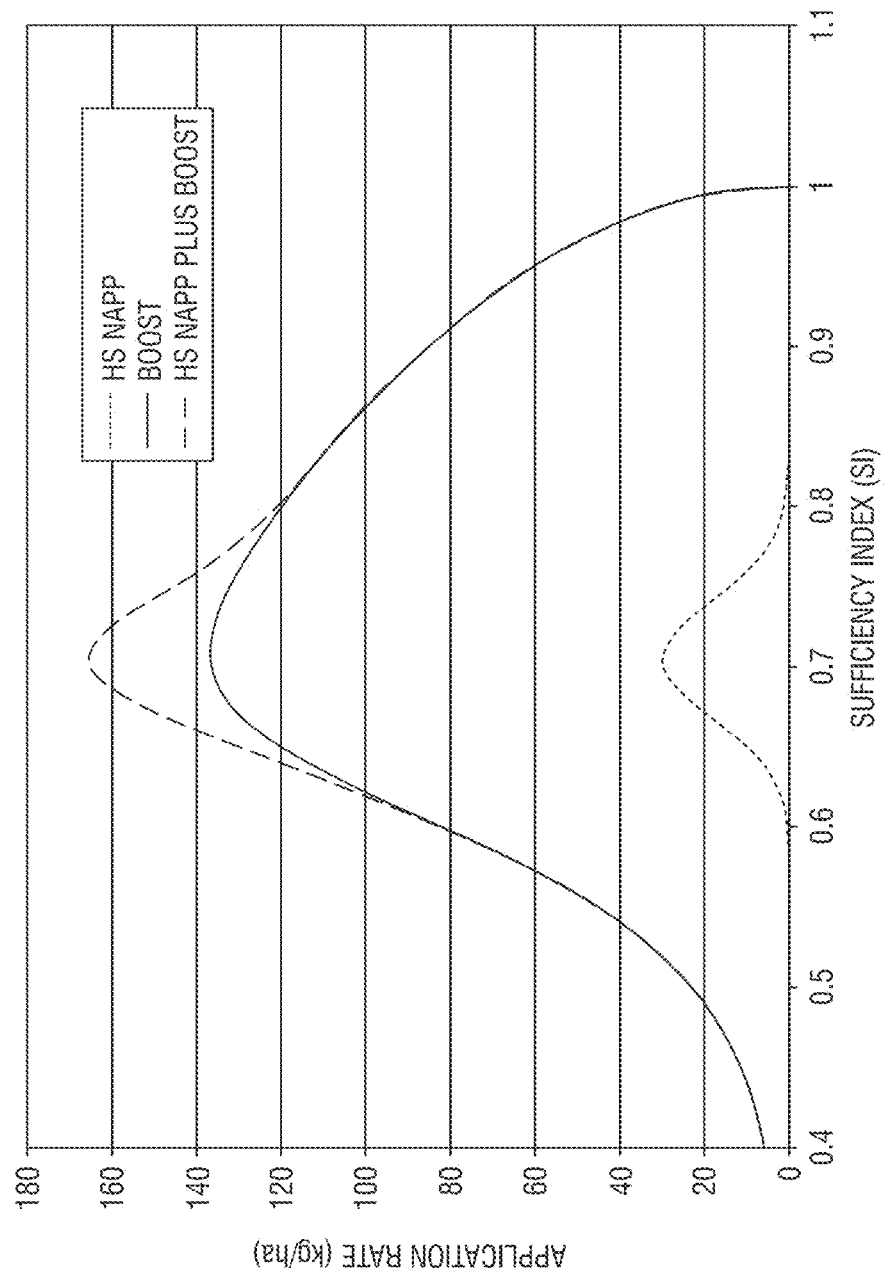
FIG. 2 illustrates the relationship between a sufficiency index and application rate and boost application rate for a nutrient.

The boost function can be very simple such as simple step function that is added to the primary nutrient application rate or it can be a more complex function that gradually applies greater amounts of N as the nutrient deficiency increases. Both functions can be added to the primary nutrient application rate after a threshold point is reached or in the case of the more complex function form, the nutrient boost function can be continuous with respect to the sensor input value. FIG. 2 shows a nutrient boost function that is added to the primary nutrient application function. Note, as the sensor readings approach the $1-\Delta SI$ boundary, the nutrient boost function starts applying additional nutrient to the nutrient stressed plants. For nutrient based boosting, the peak magnitude of the boost rate may typically be in the 10% to 20% of N optimum range however other percent values can be used based on the desired result. The boost rate may also be determined prior by the seed company based on research data collected during the development of a particular hybrid or variety. This information can be passed on to the applicator system via alphanumeric codes, RFID tag or barcode imprinted or attached to the seed bag as disclosed in Holland patent application Ser. No. 13/248,523, herein incorporated by reference in its entirety. Those skilled in the art will recognize that are many variations of the nutrient boost function that are encompassed by scope of this invention.

Figure 3:
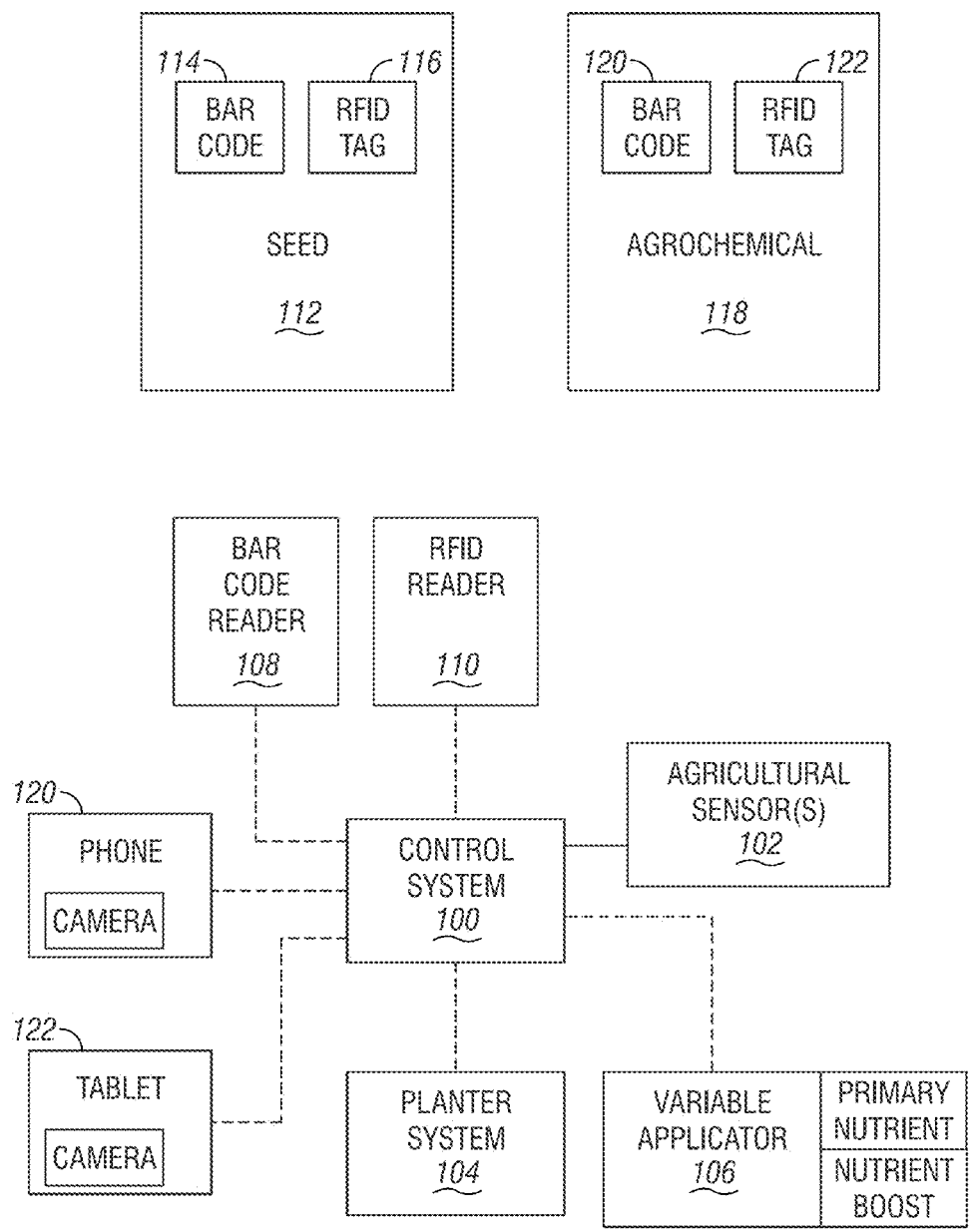
FIG. 3 illustrates a system for reading information that may be used in determining a nutrient boost rate.

As shown in FIG. 3 bar code or RFID information associated with seed in a seed container (such as a seed bag or bulk container) may be used to provide the boost rate. In FIG. 3, a control system 100 is shown which is operatively connected to one or more agricultural sensors 102. The control system 100 is also operatively connected to a system for applying agricultural products such as a planter system 104 or a variable applicator 106. The variable applicator 106 may be used to apply a nutrient at a primary nutrient rate and/or a nutrient boost rate. The control system 100 is also in operative communication with a bar code reader 108 or RFID reader 110. Additionally, the reader could be a smart phone or tablet computer with a dedicated software application to read information from a seed bag or other agricultural product (with information encoded as barcode or other encoding scheme)

via its integrated camera and transmit this information to the control system via wireless communication. For example, as shown in FIG. 3, a phone 120 may include a camera and the phone 120 may be configured to use the camera to acquire an image of a barcode and decode it. The phone 120 may be further configured to convey information obtained from the barcode to the control system 100 such as through a BLUETOOTH link or via Wi-Fi or through another type of communications channel. Similarly, a tablet computer 122 may include a camera and the table computer 122 may be configured to use the camera to acquire an image of a barcode and decode it. The tablet computer 122 may be further configured to convey information to the control system 100 such as through a wireless communications link. It is also contemplated that information derived from a barcode or RFID tag or other type of tag may be displayed on the phone 120 or tablet 122 and then manually input into the control system 100 by the user. A container such as a bag of seed 112 is shown which may include a bar code 114 and/or an RFID tag 116. The bar code can be a one- or two-dimensional bar code. Similarly, a container of agrochemical 118 may also include a bar code 120 and/or an RFID tag 122. The bar codes may be read by the bar code reader 108 and information obtained therefrom may then be communicated to the control system 100 either manually or automatically. Similarly, the RFID tags may be read by the RFID reader 110 and information obtained therefrom may then be communicated to the control system 100. Thus, the boost rate may be communicated in this manner. Alternatively, the boost rate may be manually input by a user from the seed container or otherwise. Thus, the boost rate may be received by scanning information associated with the container of seed, wirelessly reading information associated with the container of seed, or receiving user input based on data provided by the container of seed.

One embodiment has the control system and application model configured to boost nutrient application for low SI plants from a single nutrient delivery system. Another embodiment would have a primary nutrient delivery system with a second auxiliary system for boosting nutrient application to low SI plants. In either embodiment, the variable rate system would control nutrient application based on a mathematical application model, table or combination of both.

Figure 4:
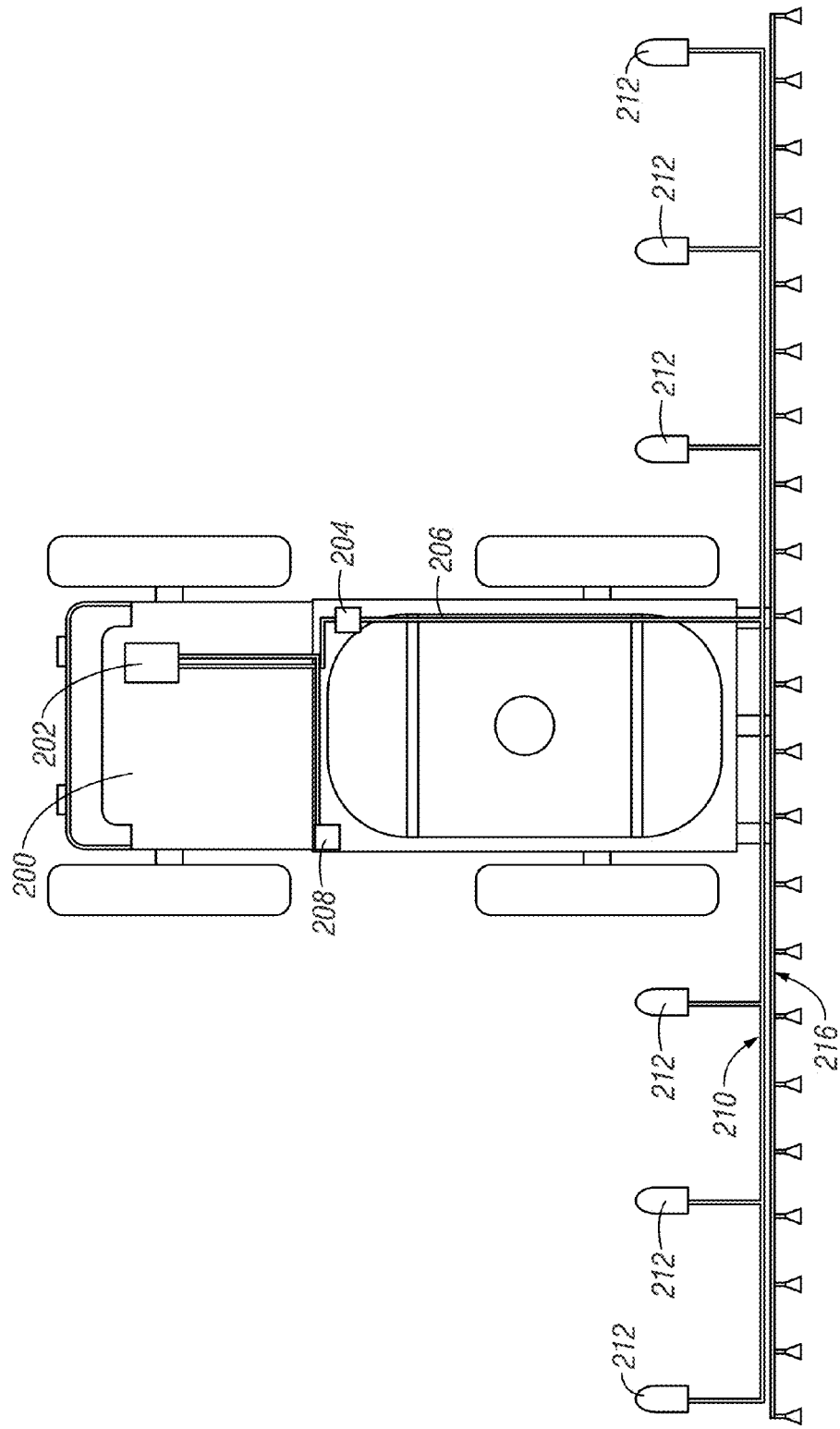
FIG. 4 illustrates one example of a system where dispensing system includes a single nutrient flow system provides nutrients according to a primary nutrient application rate and an additional nutrient boost rate.

As shown in FIG. 4 a vehicle 200 is shown with a vehicle controller 202 on the vehicle 200. A sensor electronic control unit 204 is operatively connected to a bus network 206 as is the vehicle controller 202. A flow control electronic control unit or controller 208 is operatively connected to the vehicle controller 202 which may be used to provide for variable application rates of a nutrient. A plurality of real-time sensor(s) 212 are connected along a boom of the vehicle 200. A primary nutrient flow system 210 is a part of a dispensing system 216 for dispensing nutrients.

Figure 5:
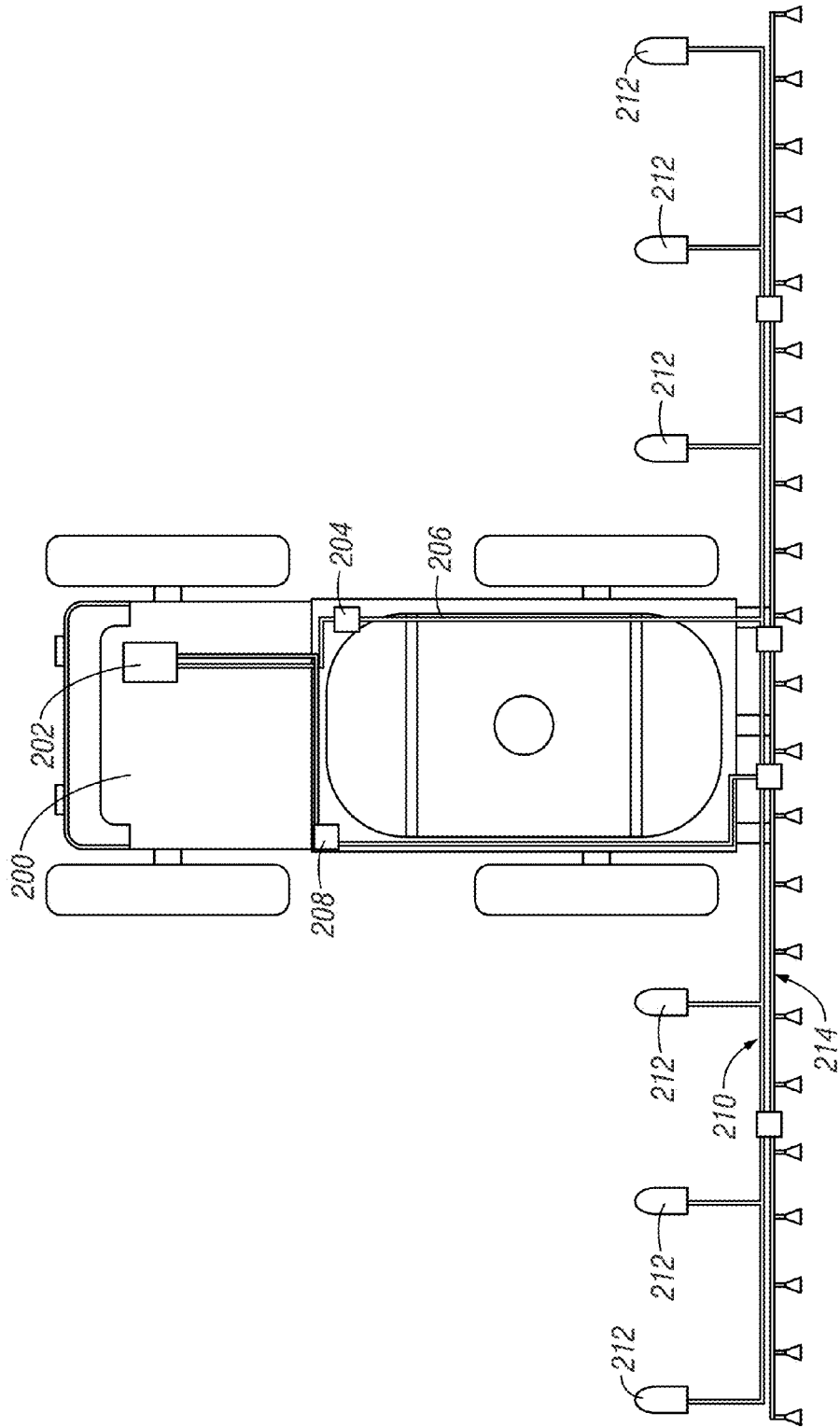
FIG. 5 illustrates one example of a system where a dispensing system includes a primary nutrient flow system for providing nutrients according to a primary nutrient application date and a secondary nutrient flow system for providing nutrients according to an additional nutrient boost rate.

As shown in FIG. 5, a dispensing system 216 may include both a primary nutrient flow system 210 and a secondary nutrient flow system 214. In such a system, the primary nutrient flow system may be used for dispensing a nutrient according to a primary nutrient application rate and the secondary nutrient flow system may be used for dispensing the nutrients according to an additional nutrient boost rate.

Another embodiment pertains to boosting the levels of N for crops that have been planted using variable rate planting technologies. In this embodiment, plants that have the highest plant population densities will need higher amounts of N fertilizer or micronutrient mixture (in liquid or dry form). One method would be to use an auxiliary map to increase or decrease rates according to plant populations. A real-time approach would be to classify these populations according to sufficiency index (SI) and increase the amount of applied N (boost) or micronutrient mixture for plants having and SI in a particular range say for SI>0.9.

Therefore various embodiments of the present invention have been described. The present invention contemplates variations in the number and types of sensors (if used), variations in the algorithms or models used in determining variable application rates, the manner in which a nutrient boost rate is determined, and other variations, options, and alternatives. The present invention is not to be limited to the specific embodiments described herein, but only to that which falls within the spirit and scope of the claimed invention.

What is claimed is:

1. An apparatus configured for dispensing nutrients, the apparatus comprising:
   a dispensing system configured for dispensing the nutrients;
   a variable rate controller operatively connected to the dispensing system and configured to control dispensement of the nutrients from the dispensing system;
   wherein the variable rate controller is programmed to determine a primary nutrient application rate and is further programmed to determine an additional nutrient boost rate;
   wherein the variable rate controller is programmed to determine whether to apply the nutrients at the primary nutrient application rate or to apply the nutrients both at the primary nutrient application rate and at the additional boost rate at a location.

2. The apparatus of claim 1 wherein the dispensing system comprises a primary nutrient flow system for dispensing the nutrients according to the primary nutrient application rate and a secondary nutrient flow system for dispensing the nutrients according to the additional nutrient boost rate.

3. The apparatus of claim 1 wherein the variable rate controller is programmed to determine the additional nutrient boost rate based on planting population.

4. The apparatus of claim 1 wherein the nutrients comprise nitrogen.

5. The apparatus of claim 1 wherein the variable rate controller determines an index for the crop and wherein the variable rate controller uses the index in determining the primary nutrient application and the additional nutrient boost rate.

6. The apparatus of claim 5 wherein the index is a sufficiency index.

7. The apparatus of claim 5 wherein, the additional nutrient boost rate is determined using a nutrient boost function.

8. The apparatus of claim 7 wherein the nutrient boost function is a step function.

9. The apparatus of claim 1 wherein the additional nutrient boost rate is more than 10 percent of an optimum value for the primary nutrient application rate.

10. A method for application of nutrients for a crop within a field, the method comprising:
    determining a primary nutrient application rate using a controller;
    determining an additional nutrient boost rate using the controller;
    applying a nutrient to a location on the crop or in the field at both the primary nutrient application rate and at the additional nutrient boost rate using a dispensing system.

11. The method of claim 10 wherein the nutrient is applied at the primary nutrient application rate using a primary nutrient flow system.

12. The method of claim 11 wherein the nutrient is applied at the additional nutrient boost rate using a secondary nutrient flow system.

13. The method of claim 10 further comprising determining a sufficiency index for the crop.

14. The method of claim 13 wherein the step of determining the primary nutrient application rate using the controller comprises using the sufficiency index in determining the primary nutrient application rate.

15. The method of claim 13 wherein the step of determining the additional nutrient boost rate using the controller comprises using the sufficiency index in determining the additional nutrient boost rate.

16. The method of claim 10 wherein the step of determining the additional nutrient boost rate using the controller comprises receiving as input the boost rate.

17. The method of claim 16 wherein a representation of the boost rate is associated with a container of seed.

18. The method of claim 17 wherein the boost rate is received by scanning information associated with the container of seed, wirelessly reading information associated with the container of seed, or receiving user input based on data provided by the container of seed.

19. The method of claim 17 wherein the additional nutrient boost rate is at least 10 percent of the primary nutrient application rate.

20. The method of claim 10 wherein the step of determining the additional nutrient boost rate using the controller is at least partially based on planting population.

21. The method of claim 10 wherein the step of determining the additional nutrient boost rate using the controller is at least partially based on a prescription map.

22. An apparatus configured for dispensing nutrients, the apparatus comprising:
   a dispensing system configured for dispensing the nutrients;
   a variable rate controller operatively connected to the dispensing system and configured to control dispensement of the nutrients from the dispensing system onto a crop;
   wherein the variable rate controller is programmed to determine a primary nutrient application rate using a sufficiency index for the crop and is further programmed to determine an additional nutrient boost rate;
   wherein the primary nutrient application rate is an optimum nutrient application rate based on the sufficiency index.

* * * * *